US011835068B2

(12) United States Patent
Paech

(10) Patent No.: US 11,835,068 B2
(45) Date of Patent: Dec. 5, 2023

(54) COMPRESSED AIR SUPPLY DEVICE, SYSTEM AND PROCEDURE

(71) Applicant: Festo SE & Co. KG, Esslingen (DE)

(72) Inventor: Stephan Paech, Esslingen (DE)

(73) Assignee: Festo SE & Co. KG, Esslingen (DE)

( * ) Notice: Subject to any disclaimer, the term of this patent is extended or adjusted under 35 U.S.C. 154(b) by 0 days.

(21) Appl. No.: 17/325,724

(22) Filed: May 20, 2021

(65) Prior Publication Data

US 2021/0381530 A1 Dec. 9, 2021

(30) Foreign Application Priority Data

Apr. 7, 2020 (DE) ........................ 102020204484.8

(51) Int. Cl.

*F15B 11/10* (2006.01)
*F15B 11/00* (2006.01)
*F15B 11/036* (2006.01)
*F15B 13/08* (2006.01)
*G06N 20/00* (2019.01)

(52) U.S. Cl.

CPC ............ *F15B 11/10* (2013.01); *F15B 11/006* (2013.01); *F15B 11/036* (2013.01); *F15B 13/085* (2013.01); *F15B 13/0832* (2013.01); *F15B 2211/30575* (2013.01); *F15B 2211/526* (2013.01); *F15B 2211/8855* (2013.01); *G06N 20/00* (2019.01)

(58) Field of Classification Search

CPC .... F15B 19/002; F15B 19/007; F15B 11/006; F15B 2211/327; F15B 2211/755; F15B 2211/8855

See application file for complete search history.

(56) References Cited

U.S. PATENT DOCUMENTS 5,880,957 A * 3/1999 Aardema ........... G05B 19/0426 700/86
7,021,191 B2 * 4/2006 Moler .................... G05B 19/43 91/393
7,926,409 B2 * 4/2011 Arbter ................ F15B 13/0867 91/459
2009/0234508 A1 * 9/2009 Kallfass ................ E02F 9/2267 700/282
2014/0336829 A1 * 11/2014 Maichl .................... F15B 21/08 700/282
2018/0245608 A1 * 8/2018 Doll ........................ F16K 31/42

(Continued)

FOREIGN PATENT DOCUMENTS

DE 3545676 A1 6/1987
DE 102016107407 A1 5/2017

(Continued)

*Primary Examiner* — Thomas E Lazo

(74) *Attorney, Agent, or Firm* — Hoffmann & Baron, LLP

(57) ABSTRACT

A compressed air provision device (2) for aerating a first pressure chamber (10) of a pneumatic actuator in order to actuate an actuator element (11) of the pneumatic actuator (3) in accordance with an actuation specification, in particular a position, movement, pressure and/or force specification. The compressed air provision device (2) is configured to calculate an aeration period (bd) and to aerate the first pressure chamber (10) in accordance with the calculated aeration period (bd) in order to bring about actuation of the actuator element (11) in accordance with the actuation specification.

22 Claims, 3 Drawing Sheets

1
3
11, 25
11, 26
20
10
9
5, 23
8
15, 17
2
21
14
6
15, 19
12
22
6
5, 24
15, 18
15, 16
7
4

(56) References Cited

U.S. PATENT DOCUMENTS

| | | | | |
|---|---|---|---|---|
| 2019/0078592 | A1 * | 3/2019 | Schiesser | F15B 11/064 |
| 2019/0093681 | A1 * | 3/2019 | Doll | F15B 13/0889 |
| 2019/0136880 | A1 * | 5/2019 | Neumann | F15B 15/2838 |

FOREIGN PATENT DOCUMENTS

| | | | |
|---|---|---|---|
| DE | 102017222954 | A1 | 6/2019 |
| EP | 0226803 | A2 * | 7/1987 |

* cited by examiner

COMPRESSED AIR SUPPLY DEVICE, SYSTEM AND PROCEDURE

BACKGROUND OF THE INVENTION

The invention relates to a compressed air provision device for aerating a first pressure chamber of a pneumatic actuator in order to actuate an actuator element of the pneumatic actuator in accordance with an actuation specification, in particular a position specification, movement specification, pressure specification and/or force specification.

For example, the actuation specification is a position specification which specifies that the actuator element is to be moved to a specific position, for example a first position. Furthermore, the actuation specification (as a pressure specification and/or force specification) can also specify a pressure and/or a force that is to act on the actuator element and is to be achieved by aerating the first pressure chamber.

In order to actuate the actuator element according to the position specification, the first pressure chamber is conventionally aerated until the actuator element reaches the specific position, for example the first position, and is aerated for as long as the actuator element is to be held in the specific position, for example the first position.

In order to fulfill the pressure specification and/or the force specification, the pressure of the first pressure chamber is conventionally closed-loop controlled. For the closed-loop pressure control, it is often necessary to supply compressed air to the first pressure chamber and to discharge compressed air from the first pressure chamber several times during an actuation of the actuator element in order to fulfill the pressure specification and/or the force specification. For this purpose, the valve units used for the compressed air supply and the compressed air discharge usually have to perform a plurality of switching cycles and/or assume intermediate positions.

SUMMARY OF THE INVENTION

It is an object of the invention to perform actuation of the actuator element in an efficient manner.

The object is solved by a compressed air provision device according to claim 1. The compressed air provision device is adapted to calculate an aeration period and to aerate the first pressure chamber according to the calculated aeration period to cause actuation of the actuator element according to the actuation specification.

By calculating the aeration duration and aerating according to the calculated aeration duration, it becomes possible for the compressed air provision device to aerate the first pressure chamber only until there is enough compressed air in the first pressure chamber to fulfill the actuation specification, for example, to move the actuator element into the specific position, in particular the first position, and/or to achieve the specified pressure and/or the specified force.

Aeration of the first pressure chamber can thus be terminated earlier—namely after the calculated aeration time has elapsed—and thus before the actuation is completed (i.e. before the actuation specification is fulfilled). Due to the shorter aeration, compressed air can be saved, so that an efficient operation is possible with regard to the amount of consumed compressed air.

Furthermore, the calculation of the aeration duration and the aeration according to the calculated aeration duration makes it possible to fulfill the actuation specification, for example the pressure and/or force specification, with only one single aeration. Preferably, only one switching cycle of a valve unit is required for the one single aeration with which the actuation specification, for example the pressure and/or force specification, is fulfilled. A switching cycle of the valve unit comprises, for example, only a single opening of the valve unit and only a single closing of the valve unit. As a result of the fact that the actuation specification can be fulfilled with only a single switching cycle, it is possible to reduce the number of switching cycles required per actuation, so that efficient operation can also be performed in terms of the number of switching cycles performed. The valve unit used to provide the aeration of the first pressure chamber is expediently a switching valve, in particular a switching valve without a closed-loop position control loop. A switching valve is a valve that has exactly two switching states (for a respective working outlet), namely a fully open switching state and a fully closed switching state. A switching valve has no intermediate states between the fully open switching state and the fully closed switching state. A switching valve therefore only has the fully open switching state and the fully closed switching state and no other switching states, such as intermediate states.

Advantageous further developments are the subject of the dependent claims.

The invention further relates to a system comprising the compressed air provision device and the actuator.

The invention further relates to a method of operating the compressed air provision device or system, comprising the steps of: Calculating the duration of aeration and aerating the first pressure chamber in accordance with the calculated duration of aeration to effect actuation in accordance with the actuation specification.

BRIEF DESCRIPTION OF THE DRAWINGS

Further exemplary details as well as exemplary embodiments are explained below with reference to the figures. Thereby shows FIG. 1 a schematic illustration of a system, FIG. 2 a diagram of a pressure in a first pressure chamber and a diagram of a switching state of a first valve unit, FIG. 3 a diagram of the switching state of the first valve unit and two diagrams of switching states of a fourth valve unit, FIG. 4 a diagram of the pressure in the first pressure chamber and the pressure in the second pressure chamber, and FIG. 5 a flow diagram of a method for operating the system or a compressed air provision device.

DETAILED DESCRIPTION OF THE PREFERRED EMBODIMENTS

Figure 1:
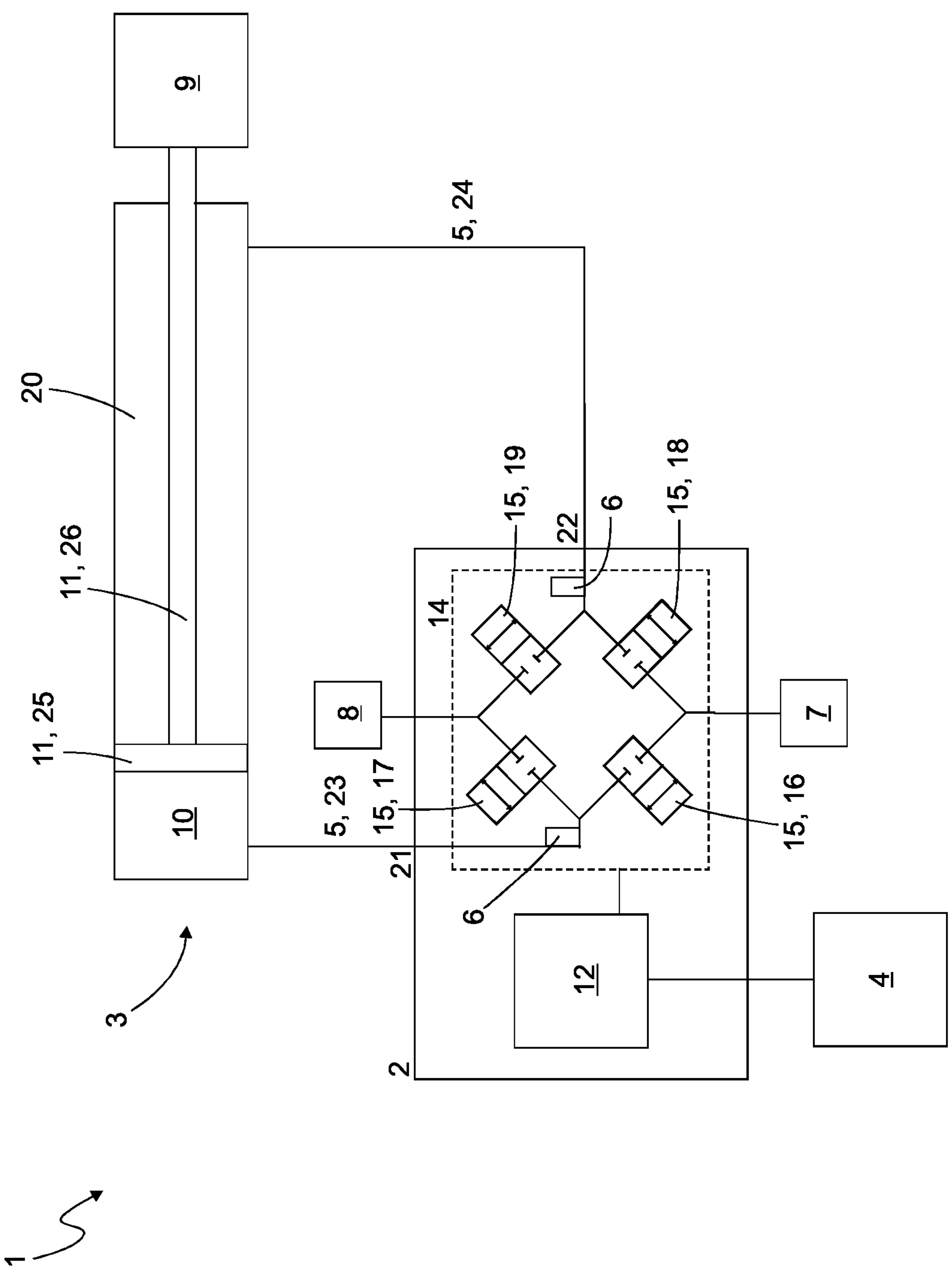

FIG. 1 shows an exemplary system 1 with a compressed air provision device 2 and a pneumatic actuator 3. Optionally, the system 1 further comprises a higher-level controller 4, a pneumatic line arrangement 5, a sensor device 6, a compressed air source 7, a compressed air sink 8 and/or an actuation object 9 to be actuated by the pneumatic actuator 3.

The system 1 represents an exemplary application environment for the compressed air provision device 2. The compressed air provision device 2 can preferably also be provided by itself.

The system 1, in particular the compressed air provision device 2, is expediently designed for industrial use, in particular for industrial automation, for example for factory automation and/or process automation. The system 1 is, for example, an industrial automation system. The system 1, in particular the compressed air provision device 2, is expediently designed to actuate, for example move, grip and/or clamp, the actuation object 9 by means of the actuator 3 as part of an industrial process, in particular an industrial manufacturing process.

The compressed air provision device 2 is used to aerate a first pressure chamber 10 of the pneumatic actuator 3 in order to actuate an actuator element 11 of the pneumatic actuator 3 in accordance with an actuation specification. The actuation specification comprises, for example, a position specification, a movement specification, a pressure specification and/or a force specification.

The position specification specifies, for example, a position, in particular an end position, to which the actuator element 11 is to be moved. The movement specification specifies, for example, a movement that is to be performed with the actuator element 11. The pressure specification specifies, for example, a pressure for the first pressure chamber 10, a second pressure chamber 20 and/or a pressure difference between the first pressure chamber 10 and the second pressure chamber 20. The force specification specifies, for example, a force to be applied to the actuator element 11 and/or the actuation object 9.

The actuation specification, in particular the pressure specification and/or force specification, respectively defines a specification range, in particular a value interval. For example, the pressure specification specifies a pressure value range, in particular a pressure value interval. Furthermore, the force specification specifies, for example, a force value range, in particular a force value interval.

The compressed air provision device 2 is configured to calculate an aeration period bd and to aerate the first pressure chamber 10 in accordance with the calculated aeration period bd in order to bring about actuation of the actuator element 11 in accordance with the actuation specification. In particular, the compressed air provision device 2 is configured to carry out a continuous aeration of the first pressure chamber 10 in order to actuate the actuator element 11 in accordance with the actuation specification, the aeration being expediently limited to a time period which corresponds to the calculated aeration duration bd.

The compressed air provision device 2 is preferably configured to calculate the aeration duration bd in response to and/or on the basis of the actuation specification. Expediently, the compressed air provision device 2 is further configured to take into account a pressure in the first pressure chamber 10 and/or in the second pressure chamber 20 and/or a system parameter, in particular a system constant, of the system 1 when calculating the aeration duration.

In the following, with reference to FIG. 1, the exemplary structure of the system 1 and its components will be discussed in more detail:

The compressed air provision device 2 comprises, by way of example, a control unit 12, for example a microcontroller, and a valve device 14. The control unit 12 is expediently designed to calculate the aeration duration bd. The control unit 12 is expediently further configured to control the valve device 14 on the basis of the calculated aeration duration bd in order to effect aeration of the first pressure chamber 10 by means of the valve device 14, so that the actuator element 11 is actuated in accordance with the actuation specification. In particular, the control unit 12 is a microcontroller. Exemplarily, the control unit 12 has a power consumption of at most 10 watts.

In an exemplary embodiment, the valve device 14 comprises a first working outlet 21. Optionally, the valve device 14 further comprises a second working outlet 22. The first working outlet 21 is pneumatically connected to the first pressure chamber 10 via a first line 23, for example a hose, of the line arrangement 5. The second working outlet 22 is pneumatically connected to a second pressure chamber 20 of the actuator 3 via a second line 24, for example a hose, of the line arrangement 5.

The valve device 14 comprises one or more valve units 15. Exemplarily, the valve units 15 comprise a first valve unit 16, a second valve unit 17, a third valve unit 18 and/or a fourth valve unit 19. Purely exemplarily, the valve units 15 are connected as a full bridge.

The first valve unit 16 is preferably a switching valve. Exemplarily, the first valve unit 16 is a 2/2-way valve, in particular a 2/2-way switching valve. In particular, the first valve unit 16 is not a proportional valve. Preferably, several or all of the valve units 15 are designed as switching valves, 2/2-way valves, in particular 2/2-way switching valves and/or not as proportional valves. Exemplarily, the first valve unit 16 and/or all valve units 15 are designed as piezo valves.

The first valve unit 16 is connected between the compressed air source 7 and the first working outlet 21. The second valve unit 17 is connected between the compressed air sink 8 and the first working outlet 21. The third valve unit 18 is connected between the compressed air source 7 and the second working outlet 22. The fourth valve unit 19 is connected between the compressed air sink 8 and the second working outlet 22.

The first valve unit 16, in particular each valve unit 15, has two switching states, in particular exactly two switching states. Exemplarily, the first valve unit 16, in particular each valve unit 15, has (as switching states) respectively an open switching state and a closed switching state. The open switching state is in particular a fully open switching state and the closed switching state is in particular a fully closed switching state. The first valve unit 16, in particular each valve unit 15, is expediently designed as a switching valve and can preferably selectively assume a fully open switching state or a fully closed switching state.

The compressed air provision device 2 is expediently designed as a valve arrangement, for example as a valve terminal. The valve device 14 is expediently designed as a valve module, in particular as a plate-shaped valve module. According to a preferred embodiment, the compressed air provision device 2 comprises a connection plate on which a plurality of plate-shaped valve modules are arranged next to one another, the valve device 14 being formed by one or two of the valve modules. Expediently, a valve device 14 having expediently four valve units 15 is provided in each valve module. Preferably, the compressed air provision device 2 comprises a control module which comprises the control unit 12 and is arranged, for example, on the connection plate. Furthermore, the control unit 12 can also be integrated in the connecting plate or a valve module.

According to an alternative embodiment, the first valve unit and/or the second valve unit are each designed as a 3/3-way switching valve. Expediently, the first valve unit provides the first working outlet connected to the first pressure chamber and the second valve unit provides the second working outlet connected to the second pressure chamber. Via the first valve unit, the first pressure chamber 10 can be selectively aerated, de-aerated or blocked. Via the second valve unit, the second pressure chamber 20 can be selectively aerated, de-aerated or blocked.

The actuator 3 is exemplarily designed as a pneumatic cylinder. Exemplarily, the actuator 3 is double-acting. The actuator 3 comprises the actuator element 11, which can be moved into two different positions, in particular two different end positions, by applying compressed air. The actuator 3 comprises the first pressure chamber 10 and the second pressure chamber 20, through the aeration of which the actuator element 11 can be actuated. Exemplarily, the actuator element 11 is displaceable into a first position, in particular a first end position, by aerating the first pressure chamber 10 (and expediently de-aerating the second pressure chamber 20). Furthermore, by aerating the first pressure chamber 10 (and expediently de-aerating the second pressure chamber 20), the actuator element 11 is displaceable into a second position, in particular a second end position, different from the first position.

According to one possible embodiment, the actuator 3 can be of single-acting design and comprise, for example, a spring element that urges the actuator element 11 into the second position. In the single-acting design, the actuator 3 expediently does not comprise a second pressure chamber.

The actuator element 11 is exemplarily designed as a piston arrangement and comprises in particular a piston 25 and/or a piston rod 26 coupled, in particular fixed, to the piston 25. The piston 25 delimits the first pressure chamber 10 (and, if present, the second pressure chamber 20). Coupled to the actuator element 11, in particular the piston rod 26, is the actuation object 9, which is actuated by a movement of the actuator element 11.

The actuator 3 can be designed, for example, as a gripping device which serves to grip (as the actuation to be performed) the actuation object 9. The actuator element 11 is expediently a gripping element.

For example, the actuator 3 is configured to perform a long stroke (compared to the diameter of the first pressure chamber 10) with the actuator element 11. For example, the distance travelled by the actuator element 11 from the second position to the first position is greater than the diameter of the first pressure chamber 10. Furthermore, the distance travelled by the actuator element 11 from the second position to the first position can be smaller than the diameter of the first pressure chamber 10.

The higher-level controller 4 is communicatively connected to the compressed air provision device 2, in particular to the control unit 12. The higher-level controller 4 is designed, for example, as a programmable logic controller, PLC, and/or as a cloud server. The higher-level controller 4 serves in particular to provide the actuation specification to the control unit 12.

The sensor device 6 preferably comprises a pressure sensor device for detecting one or more pressure values that depend on a pressure in the first pressure chamber 10 and/or the second pressure chamber 20. For example, the pressure sensor device is designed to detect the pressure in the first pressure chamber 10, the pressure in the second pressure chamber 20 and/or the pressure difference between the first pressure chamber 10 and the second pressure chamber 20 and to provide this as a pressure value. The pressure in the first pressure chamber 10 may also be referred to as the first pressure and the pressure in the second pressure chamber may be referred to as the second pressure. The pressure sensor device is expediently part of the compressed air provision device 2. In particular, the pressure sensor device is integrated in the compressed air provision device 2. The sensor device 6 is expediently communicatively connected to the control unit 12. Alternatively, the pressure sensor device may be arranged on the actuator 3. The sensor device 6 may further comprise a position sensor device for detecting the position of the actuator element 11.

Figure 2:
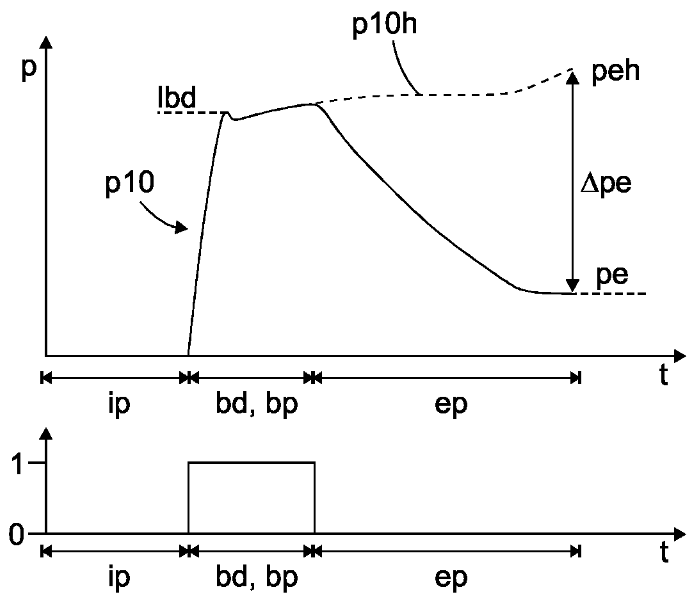

With reference to FIG. 2, the aeration of the first pressure chamber 10 according to the calculated aeration time bd will be explained in more detail below.

FIG. 2 shows a first diagram (the upper diagram) in which the pressure p10 in the first pressure chamber 10 is plotted versus time t. FIG. 2 further shows a second diagram (the lower diagram) in which the switching state of the first valve unit 16 is plotted versus time. The "1" drawn on the vertical axis represents the open switching state of the first valve unit 16 and the "0" represents the closed switching state of the first valve unit 16. The horizontal time axes of the two diagrams are synchronous with each other.

As mentioned above, the compressed air provision device 2 comprises the first valve unit 16 for aerating the first pressure chamber 10. Expediently, the compressed air provision device 2 is configured to keep the first valve unit 16 open—i.e. in the open switching state—for the calculated aeration duration bd in order to aerate the first pressure chamber 10. The compressed air provision device 2 is expediently further designed to close the first valve unit 16 immediately after the calculated aeration period bd has elapsed.

As shown in FIG. 2, the control unit 12 sets the first valve unit 16 to the open switching state for the calculated aeration period bd—i.e. for the duration of the calculated aeration period bd—and to the closed switching state before and after this—in particular before the start of the aeration period bd and after the end of the aeration period bd.

With reference to FIG. 2, an exemplary actuation of the actuator element 11 will be explained. Exemplarily, the actuator element 11 is moved from the second position to the first position by the actuation. The actuation is performed as part of an actuation process performed by the compressed air provision device 2. Exemplarily, the actuation process comprises three phases directly following each other in time, namely an initial phase ip, an aeration phase bp and an expansion phase ep.

The compressed air provision device 2 is expediently designed to keep the first valve unit 16 closed in the initial phase ip. The compressed air provision device 2 is expediently further designed to keep the second valve unit 17 open or closed in the initial phase ip. Expediently, the compressed air provision device 2 is designed to keep the first pressure chamber 10 in a (in particular completely) de-aerated state in the initial phase ip, for example by placing the first working outlet 21 in an de-aeration state so that the first working outlet 21 is pneumatically connected to the compressed air sink 8.

Exemplarily, the control unit 12 is configured to provide the actuation specification in the initial phase ip. For example, the control unit 12 receives the actuation specification from the higher-level controller 4 or the control unit 12 generates the actuation specification, for example on the basis of a sensor signal from the sensor device 6. Exemplarily, the actuation specification comprises a position specification that specifies a position, in particular the first position, into which the actuator element 11 is to be moved. Optionally, the actuation specification further comprises a pressure specification which specifies a final pressure pe. The pressure specification, in particular the final pressure pe, is expediently a pressure value range, in particular a pressure value interval. The final pressure pe is preferably a pressure that is to be present when the position specification is fulfilled, i.e. in particular when the actuator element is in the first position. The final pressure pe is expediently the pressure in the first pressure chamber 10 and/or a pressure difference between the first pressure chamber 10 and the second pressure chamber 20.

The compressed air provision device 2 is designed to move the first valve unit 16 into the open position in response to the actuation specification, thereby expediently starting the aeration phase bp. Exemplarily, the compressed air provision device 2 leaves or moves the second valve unit 17 in the closed switching state. As a result of the first valve unit 16 being in the open position, the first pressure chamber 10 is aerated. Exemplarily, compressed air from the compressed air source 7 is supplied to the first pressure chamber 10 via the first valve unit 16. Exemplarily, the first working outlet 21 is in a aeration state in which the first working outlet 21 is pneumatically connected to the compressed air source 7.

Due to the aeration of the first pressure chamber 10, the pressure p10 in the first pressure chamber 10 increases until a breakaway pressure lbd is reached at which the pressure p10 in the first pressure chamber 10 is high enough to cause the actuator element 11 to move (from a rest state). Exemplarily, the actuator element 11 moves toward the first position from the time the pressure p10 reaches the breakaway pressure lbd. The pressure p10 temporarily decreases after reaching the breakaway pressure lbd and then continues to increase as long as the first valve unit 16 is open and the first pressure chamber 10 is aerated.

The compressed air provision device 2, in particular the control unit 12, is designed to calculate the aeration duration bd expediently during the aeration phase bp and/or during the initial phase ip.

The compressed air provision device 2 is configured to monitor the time duration of the aeration of the first pressure chamber 10, i.e. exemplarily the time duration of the aeration phase bp. The compressed air provision device 2 is designed to terminate the aeration of the first pressure chamber 10 in response to the time duration of the aeration of the first pressure chamber 10, i.e. exemplarily the time duration of the aeration phase bp, reaching the calculated aeration duration bd, for example by the compressed air provision device 2 setting the first valve unit 16 to the closed switching state. The control unit 12 is expediently designed to control the valve unit 16 in such a way that the time duration of the aeration of the first pressure chamber 10 is equal to the calculated aeration duration bd. The time duration of the aeration—i.e. the time duration from the setting of the first valve unit 16 in the open switching state to the setting of the first valve unit 16 in the closed switching state—is expediently equal to the calculated aeration duration bd. The time duration of the aeration phase bd is equal to the calculated aeration duration bd.

By placing the first valve unit 16 in the closed switching state, the aeration of the first pressure chamber 10 ends and thus, in particular, the aeration phase bp ends. The aeration of the first pressure chamber 10 that takes place during the aeration phase bp can also be referred to as an aeration pulse. The duration of the aeration pulse is equal to the calculated aeration duration bd. The aeration, in particular the aeration pulse, is expediently continuous, i.e. in particular uninterrupted.

Expediently, the actuation of the actuator element 11 has not yet been completed at the time when the aeration phase bp ends. For example, the actuator element 11 has not yet reached the position specified by the position specification, in particular the first position, and/or the pressure p10 in the first pressure chamber 10 has not yet reached the final pressure pe specified by the pressure specification. In particular, the actuator element 11 continues to move in the direction of the first position at the time when the aeration phase bp ends.

The aeration phase bp is followed by the expansion phase ep. The compressed air provision device 2 is designed to leave the first valve unit 16 and preferably the second valve unit 17 closed in the expansion phase ep. The first working outlet 21 is in a blocking state, in which the compressed air present in the first line 23 and in the first pressure chamber 10 is blocked. The actuator element 11 continues to move toward the first position during the expansion phase. The first pressure chamber 10 becomes larger due to the movement of the actuator element 11. Thus, there is an expansion of the first pressure chamber 10. The volume of compressed air in a first system volume formed by the first pressure chamber 10 and the first line 23 expediently remains constant or at least does not increase. The pressure p10 in the first pressure chamber 10 decreases exemplarily in the expansion phase ep, in particular monotonously.

The actuator element 11 reaches the position specified by the position specification, for example the first position, and stops. At the time when the actuator element 11 reaches the predetermined position, the expansion phase ep ends. The pressure p10 in the first pressure chamber 10 no longer decreases. The first working outlet 21 expediently remains in the blocking state even after the expansion phase ep.

Exemplarily, the pressure p10 in the first pressure chamber 10 reaches the final pressure pe according to the pressure specification at the end of the expansion phase ep.

Preferably, the compressed air provision device 2, is designed to open the first valve unit 16 at most once and to close it at most once in order to fully actuate the actuator element 11 in accordance with the actuation specification. A single opening and a single closing shall together also be referred to as a (single) switching cycle of the valve unit 16. Exemplarily, during the entire actuation process—that is, from the provision of the actuation specification to the fulfillment of the actuation specification, for example, the position specification and/or pressure specification—the compressed air provision device 2 performs only a single switching cycle, that is, only a single opening and a single closing of the first valve unit 16.

Exemplarily, the compressed air provision device 2 performs only a single closing (and no opening) of the second valve unit 17 or no single opening and no single closing of the second valve unit 17 during the entire actuation process—that is, from the provision of the actuation specification to the fulfillment of the actuation specification, for example, the position specification and/or pressure specification. In particular, the compressed air provision device 2 does not perform any de-aeration of the first pressure chamber 10 during the entire actuation process and expediently does not put the first working outlet 21 into the de-aeration state in which the first working outlet 21 is fluidically connected to the compressed air sink 8.

The compressed air provision device 2 can be designed to check (after an actuation process has been carried out, in particular after a first aeration has been carried out in accordance with the calculated aeration duration bd) whether the actuation specification has been met, for example by means of the sensor device 6, in particular by means of the pressure sensor device and/or the position sensor device. The check is performed, for example, in response to an elapsed timer and/or in response to the position sensor device detecting that the actuator element 11 has reached the predetermined position. The compressed air provision device 2 is configured to perform a second aeration of the first pressure chamber 10 in response to the actuation specification not being satisfied (after the actuation process has been performed, in particular the first aeration in accordance with the calculated actuation duration). For example, the compressed air provision device 2, in particular the control unit 12, calculates a second aeration duration for the second aeration and performs the second aeration according to the calculated second aeration duration. The second aeration can also be referred to as correction aeration.

The compressed air provision device 2 can be designed in particular to open the first valve unit 16 at most twice and to close it twice in order to fully actuate the actuator element 11 in accordance with the actuation specification—i.e. in particular to fulfill the actuation specification. In particular, the compressed air provision device 2 is designed to perform a maximum of two switching cycles with the first valve unit 16 in order to fulfill the actuation specification.

The compressed air provision device 2 is expediently designed to terminate the aeration of the first pressure chamber 10 in accordance with the calculated aeration duration bd before the actuator element 11 is fully actuated. As already explained above, the compressed air provision device 2, in particular the control unit 12, is expediently designed to end the aeration of the first pressure chamber 10 at a time at which the actuation specification, in particular the position specification and/or the pressure specification, has not yet been fulfilled. For example, the compressed air provision device 2 terminates the aeration of the first pressure chamber 10 at a time at which the actuator element 11 is still moving towards the position specified by the position specification and/or the pressure p10 of the first pressure chamber 10 has not yet reached the final pressure pe specified by the pressure specification.

The compressed air provision device 2, in particular the control unit 12, is preferably designed to calculate the aeration period bd in such a way that it is shorter than the time required (from the start of the aeration phase bp) to fulfill the actuation specification, in particular the position specification and/or the pressure specification.

FIG. 2 shows a hypothetical pressure course p10*a* as a dashed line. The hypothetical pressure curve p10*a* is given in the hypothetical case in which the first pressure chamber 10 is additionally aerated in the expansion phase ep; for example, when the first valve unit 16 remains in the open switching state in the expansion phase ep. Exemplarily, in this case, the pressure in the first pressure chamber 10 continues to increase (or at least does not decrease) during the expansion phase ep. At the end of the hypothetical pressure course p10*h*, there is a hypothetical final pressure peh in the first pressure chamber 10. The hypothetical final pressure peh is greater than the actual final pressure pe. Between the hypothetical final pressure peh and the actual final pressure pe there is a pressure difference Δpe, which indicates how much pressure—and accordingly how much compressed air—is saved by ending the aeration of the first pressure chamber 10 before the actuation, in particular the movement of the actuator element into the first position, has been fully performed.

In the following, the calculation of the aeration duration bd will be discussed in more detail. The aeration duration bd can also be referred to as aeration time and is expediently a time value, in particular a time value indicating a time period. The calculation of the aeration duration bd is performed in particular by the control unit 12.

The compressed air provision device 2 is in particular designed to calculate the aeration duration bd on the basis of the actuation specification, in particular the position specification and/or pressure specification, one or more pressure values and/or one or more system parameters.

The compressed air provision device 2 is preferably designed to take into account one or more pressure values when calculating the aeration period bd, in particular a pressure value that depends on a pressure and/or a pressure change in the first pressure chamber 10 and/or the second pressure chamber 20. The compressed air provision device 2 is expediently configured to take into account, as the one or more pressure values, the breakaway pressure lbd, a supply pressure, an initial pressure in the first pressure chamber 10, an initial pressure in the second pressure chamber 20, a target pressure for the first pressure chamber 10, a final pressure of the first pressure chamber 10 in a previous actuation of the actuator element 11, and/or a pressure change of the pressure in the first pressure chamber 10 and/or the second pressure chamber 20.

Expediently, the compressed air provision device 2 is designed to determine a continuously determined difference between the pressures of the first pressure chamber 10 and the second pressure chamber 20 when calculating the aeration period bd.

The supply pressure is, for example, the pressure, in particular the maximum pressure, which is provided by the compressed air source 7. The initial pressure (in the first pressure chamber 10 and/or second pressure chamber 20) is, for example, a pressure present in the initial phase ip and/or in the aeration phase bp. For example, the initial pressure is a pressure present immediately after the start of the aeration phase bp and/or a pressure present after a predetermined time has elapsed after the start of the aeration phase bp. The target pressure is expediently the pressure specified by the pressure specification. The final pressure is expediently that pressure which was detected by the sensor device 6 during a previous actuation of the actuator element 11 when the actuation specification was fulfilled, in particular when the position specification was fulfilled. The pressure change is in particular a pressure increase, for example a pressure change rate, of the pressure in the first pressure chamber 10 in the aeration phase bp, in particular immediately after the start of the aeration phase bp.

Preferably, the compressed air provision device 2 is designed to calculate the aeration duration bd during the aeration of the first pressure chamber 10. Preferably, the compressed air provision device 2 is designed to calculate the aeration duration bd during the aeration phase bp, i.e. in particular after the first valve unit 16 has been moved into the open switching position. The compressed air provision device 2 is designed in particular to take into account, when calculating the aeration duration bd, one or more pressure values which can only be detected after the start of the aeration phase bp and/or which depend on the aeration of the first pressure chamber 10 (which takes place in the aeration phase bp).

The compressed air provision device 2 is preferably designed to take into account one or more system parameters, in particular system constants, when calculating the aeration duration bd. The system parameters depend, for example, on a geometry, in particular a volume and/or a nominal width, of a system volume to be aerated during aeration of the first pressure chamber 10. The system volume comprises, for example, the volume of the first pressure chamber 10 and the volume of the first line 23.

The compressed air provision device 2 is preferably adapted to calculate the aeration duration bd using machine learning, in particular using a regression, random forest and/or an artificial neural network. The regression includes, for example, linear regression and/or support vector regression. In particular, the compressed air provision device 2 is configured to calculate the aeration duration bd using an algorithm, in particular using a machine learning algorithm. More expediently, the compressed air provision device 2 is designed to calculate the aeration duration bd as an estimated value. Thus, the control unit 12 is particularly configured to estimate the aeration duration bd. Preferably, the compressed air provision device 2, in particular the control unit 12, comprises a predictor unit to estimate the aeration duration bd.

Optionally, the compressed air provision device 2 is configured to calculate the aeration duration bd based on a model. The model expediently takes into account a plurality of variations of parameter values of the one or more system parameters. The model is expediently provided in the control unit 12. Preferably, the model maps the actuation specification, one or more pressure values, and/or one or more system parameters to the aeration duration bd. The control unit 12 is adapted to calculate the aeration duration bd using the model.

The compressed air provision device 2 is expediently designed to adapt the model during operation, in particular on the basis of previous actuations of the actuator element 11. Preferably, the compressed air provision device 2 is designed to adapt the model on the basis of detected final pressures that were present in the first pressure chamber 10 after previous actuations of the actuator element 11 were performed (and were detected by the sensor device 6, for example). Exemplarily, the compressed air provision device 2 is adapted to compare the detected final pressures with respective associated pressure specifications to determine pressure deviations, and to adjust the model based on the pressure deviations. Exemplarily, the compressed air provision device 2 is designed to form an average value of the pressure deviations and, based on this, to provide a sliding correction factor for adjusting the model.

Preferably, the compressed air provision device 2 is configured to perform a pressure correction of the first pressure chamber 10 at random intervals, for example intervals of 50 to 200 ms.

Conveniently, the compressed air provision device 2 is designed to perform a plurality of actuations of the actuator element 11, and to calculate a respective aeration duration bd for each actuation. In particular, the compressed air provision device 2 is designed to calculate a separate, individual aeration duration bd for each actuation to be performed. More expediently, the compressed air provision device 2 is configured to perform a plurality of actuations of the actuator element 11, and to calculate a separate aeration duration bd individually for each actuation. In particular, the compressed air provision device 2 is designed to calculate a respective aeration duration bd for each actuation of the actuator element 11, which takes into account the respective actuation specification for the actuation and/or one or more respective pressure values which are detected in particular in the respective aeration phase bp.

Figure 3:
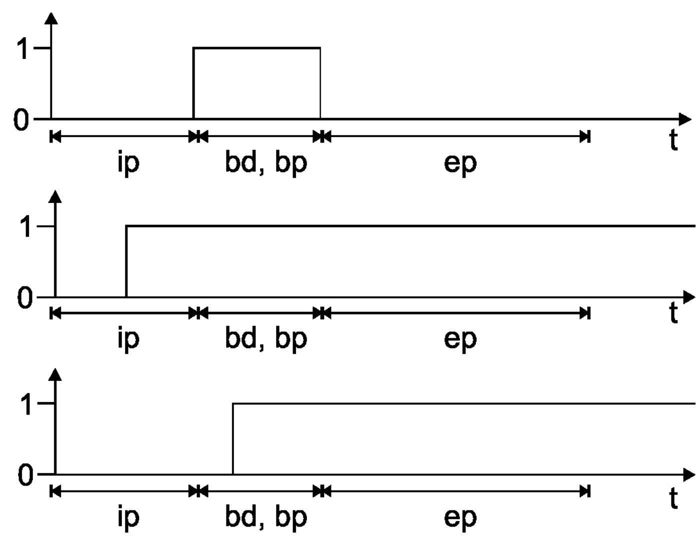

With reference to FIG. 3, possible variants for de-aerating the second pressure chamber 20 during the actuation process will be discussed below.

FIG. 3 shows a first (the top) diagram corresponding to the second diagram of FIG. 2, showing the switching state of the first valve unit 16. FIG. 3 further shows a second (the middle) diagram showing the switching state of the fourth valve unit 19 according to a first variant. FIG. 3 further shows a second (the lowest) diagram showing the switching state of the fourth valve unit 19 according to a second variant.

The fourth valve unit 19 is used to pneumatically connect the second working outlet 22 to the compressed air sink 8, in order to put the second working outlet 22 into a de-aeration state and thus to (in particular completely) de-aerate the second pressure chamber 20.

Exemplarily, the compressed air provision device 2 is designed to keep the second pressure chamber 20 in an aerated state at the beginning of the initial phase ip and/or at the beginning of the aeration phase bp. In an aerated state, the second pressure chamber 20 counteracts the actuation of the actuator element 11, in particular the movement of the actuator element into the first position.

The compressed air provision device 2 is preferably designed to de-aerate the second pressure chamber 20 (in particular completely) within the actuation of the actuator element 11 before the start of the aerating of the first pressure chamber 10. As shown in the second diagram of FIG. 3, the compressed air provision device 2 is exemplarily designed to de-aerate the second pressure chamber 20 already in the initial phase ip. For example, the compressed air provision device 2 moves the fourth valve unit 19 into the open switching position in the initial phase ip (i.e. before the aeration phase bp).

Furthermore, the compressed air provision device 2 can be designed to de-aerate the second pressure chamber 20 only after the start of the aeration of the first pressure chamber 10 within the actuation of the actuator element 11. As shown in the third diagram of FIG. 3, the compressed air provision device 2 is exemplarily designed to de-aerate the second pressure chamber 20 not until the aeration phase bp. For example, the compressed air provision device 2 moves the fourth valve unit 19 into the open switching position only after the first valve unit 16 has been moved into the open switching position. In this way, the movement of the actuator element 11 can be expediently damped and/or braked.

According to a further variant, the compressed air provision device 2 can be designed to move the fourth valve unit 19 into the open switching position simultaneously with the first valve unit 16.

Figure 4:
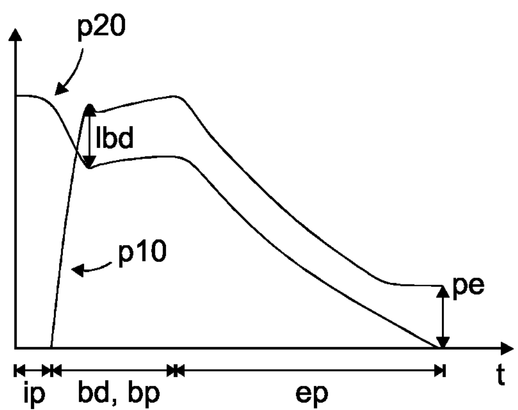

With reference to FIG. 4, an auto mode will be explained below. FIG. 4 shows a time course of the first pressure p10 in the first pressure chamber 10 and the second pressure p20 in the second pressure chamber 20 during an actuation process.

The compressed air provision device 2 is exemplarily designed to adopt the auto mode and to determine the actuation specification, in particular the pressure specification, by itself in the auto mode, in particular individually for each actuation. For example, in the auto mode, the compressed air provision device 2 automatically determines as the pressure specification the final pressure pe that the first pressure chamber 10 is to have when the actuator element 11 has reached the first position. Exemplarily, the compressed air provision device 2 is designed to determine the actuation specification, in particular the pressure specification, for example the final pressure pe, on the basis of the breakaway pressure lbd detected when the first pressure chamber 10 is aerated. The breakaway pressure lbd is expediently a pressure difference between the first pressure chamber 10 and the second pressure chamber 20. The breakaway pressure lbd is the pressure at which the actuator element 11 starts to move (from a resting state) in the aeration phase bp. Exemplarily, the compressed air provision device 2 is designed to use the detected breakaway pressure lbd as the pressure specification, in particular the final pressure pe.

In particular, the compressed air provision device 2 is designed to determine the actuation specification on the basis of the breakaway pressure lbd and/or an initial pressure in the second pressure chamber 20 and/or a continuously determined difference between the pressures of the first pressure chamber 10 and the second pressure chamber 20.

Expediently, the compressed air provision device 2 has an operating device and/or a communication interface via which a user can selectively activate or deactivate the auto mode. If the auto mode is deactivated, the compressed air provision device 2 preferably assumes a specification mode in which the compressed air provision device 2 uses a target pressure specified (for example by the higher-level controller 4) as the pressure specification, in particular the final pressure pe.

Figure 5:
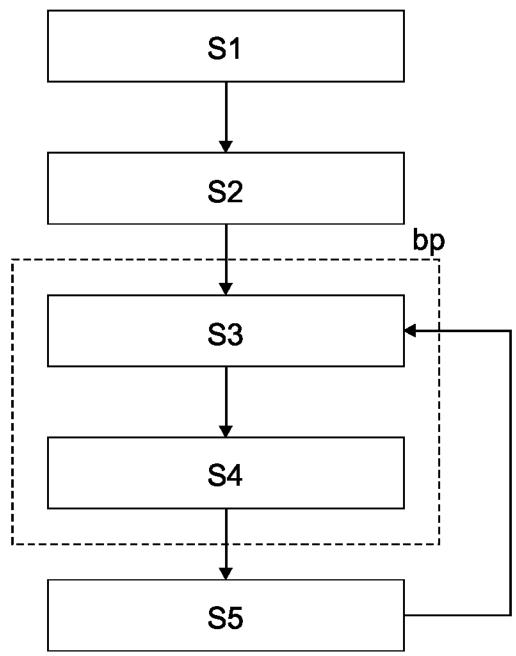

With reference to FIG. 5, a method of operating the compressed air provision device 2 will be described below.

The method comprises an optional step S1, in which a plurality of training actuations are performed. During each training actuation, the first pressure chamber 10 and/or the second pressure chamber is aerated and one or more pressure values, in particular one or more pressure curves, are recorded with the sensor device 6. The training actuations are used in particular to generate the model on the basis of which the calculation of the aeration duration bd is performed. The training actuations are thus used in particular to generate training data in order to create the model, for example a statistical model. The model is, for example, a measurement database and may have, for example, curve fields. Expediently, the training actuations are performed using a training system and/or a training compressed air provision device. Exemplarily, the training actuations are performed before the compressed air provision device 2 is used in the system 1. For the training actuations, expediently the parameter values of one or more system parameters, for example the volume of the first pressure chamber and/or the volume of the first line 23 are varied. Expediently, a plurality of combinations of different line arrangements 5, actuators 3, valve devices 14 and/or valve units 15 are used in performing the training actuations.

The method continues with a further optional step S2, in which one or more configuration actuations are performed. In each configuration actuation, the first pressure chamber 10 and/or the second pressure chamber 20 is aerated, expediently in a state in which the actuator element 11 is fixed in the first position or the second position. During each configuration actuation, one or more pressure values, in particular one or more pressure curves, are detected by the sensor device 6. The configuration actuations are performed when the compressed air provision device is commissioned in an application system, for example the system 1. The one or more configuration actuations are performed in a state in which the compressed air provision device 2 is installed in the application system. In particular, the configuration actuations are used to determine the system parameters of the application system. Preferably, there is no manual input of the system parameters. By means of the configuration actuations, the compressed air provision device 2 adapts the model used to calculate the aeration duration bd to the system parameters of the application system, for example to the volume of the first line 23 and/or the volume of the first pressure chamber 10. Based on the configuration actuations, the compressed air provision device 2 thus adapts the calculation of the aeration duration bd to the application system.

In particular, a time constant can also be determined as a system parameter based on one or more configuration actuations, which time constant indicates how quickly the pressure p10 in the first pressure chamber 10 increases when the first pressure chamber 10 is aerated.

The method further comprises a third step S3, in which the aeration period bd is calculated. The calculation is carried out in particular as already explained above, i.e. for example during the aeration phase bp.

The method further comprises a fourth step S4, in which the first pressure chamber 10 is aerated according to the calculated aeration duration bd to effect actuation according to the actuation specification. The aeration takes place in particular as already explained above.

Optionally, the method further comprises a fifth step S5, in which the model on the basis of which the aeration duration bd is calculated is adjusted taking into account the actuation of the actuator element 11 performed in step S4, for example taking into account the final pressure pe reached in the this actuation. The method then optionally continues with step S3.

Thus, as stated above, the system 1 may comprise (in particular, four independently switchable) 2/2-way switching valves (e.g., the valve units 15), two pressure sensors (e.g., the sensor device 6), and an algorithm (in particular, provided on the control unit 12) for controlling the four switching valves. The switching valves are switched on for a certain time (e.g. the calculated aeration time bd) and switched off again, with the aim of reaching a predetermined final pressure pe (e.g. the pressure target) at the end of the movement of the actuator element 11 (or at the end of the aeration of a volume, for example the first pressure chamber 10).

The necessary time (e.g. the aeration duration bd) can be determined before the target is reached—i.e. before the actuator element 11 has completely executed the movement or before the determined final pressure pe is reached. The necessary time can be determined based on the combination of system parameters (e.g., time constants) determined once beforehand and the current operating pressures (e.g., the pressure values). For example, the switching valves have only the "on" and "off" positions. Preferably, in regular operation, the target range (for example, the actuation specification) is reached with only a single switching cycle. During regular operation, the algorithm can further optimize its accuracy based on experience (for example, previously performed actuations), in particular through correction factors or reinforcement learning.

The system 1 may comprise the auto mode, in which a necessary force (for example, a pressure specification) for moving the current actuation object 9 is estimated on the basis of pressure curves (for example, on the basis of a breakaway pressure), and the necessary target range (in particular, the pressure specification) is determined on this basis, in particular autonomously and/or situation-related.

Preferably, therefore, pressure adjustment in the first pressure chamber 10 can be performed with simple switching valves (e.g. the valve units 15) with only a single switching cycle. In particular, this avoids an annoying noise, for example a clacking noise, which occurs when several switching cycles are performed in succession for the pressure adjustment.

Furthermore, the aeration time (e.g., the aeration duration bd) can be predicted based on an algorithm that obtains its support points from known combinations of the system parameters and the system states (e.g., the pressure values). For example, a machine learning algorithm is used that has been trained with laboratory experiments (for example, during the aforementioned first step S1).

Furthermore, the system 1 can be operated in the auto mode, in which preferably only exactly as much compressed air (for aerating the first pressure chamber 10) is used as is necessary with the currently applied load (i.e., for example, the forces acting on the actuator element 11) to execute the movement according to the movement specification and to keep the actuator element 11 stable in the end position.

The invention claimed is:

1. A compressed air provision device for industrial automation, for aerating a first pressure chamber of a pneumatic actuator in order to actuate an actuator element of the pneumatic actuator in accordance with an actuation specification, the compressed air provision device being configured to calculate an aeration duration and to aerate the first pressure chamber in accordance with the calculated aeration duration in order to bring about an actuation of the actuator element in accordance with the actuation specification, wherein the compressed air provision device is configured to take into account one or more pressure values when calculating the aeration duration.

2. The compressed air provision device according to claim 1, comprising a first valve unit for aerating the first pressure chamber, wherein the compressed air provision device is configured to keep the first valve unit open for the calculated aeration duration to aerate the first pressure chamber and to close the first valve unit immediately after the calculated aeration duration has elapsed.

3. The compressed air provision device according to claim 2, wherein the first valve unit is a switching valve.

4. The compressed air provision device according to claim 2, wherein the compressed air provision device is configured to open the first valve unit at most once or twice and to close it at most once or twice, in order to fully actuate the actuator element in accordance with the actuation specification.

5. The compressed air provision device according to claim 1, wherein the compressed air provision device is configured to terminate the aeration of the first pressure chamber according to the aeration duration before the actuator element is fully actuated.

6. The compressed air provision device according to claim 1, wherein the compressed air provision device is configured to carry out a plurality of actuations of the actuator element and to calculate a separate aeration duration individually for each actuation.

7. The compressed air provision device according to claim 1, wherein the compressed air provision device is configured to calculate the aeration duration using machine learning.

8. The compressed air provision device according to claim 1, wherein the compressed air provision device is configured to calculate the aeration duration on the basis of a model and to adapt the model during operation.

9. The compressed air provision device according to claim 8, wherein the compressed air provision device is configured to adapt the model on the basis of previous actuations of the actuator element.

10. The compressed air provision device according to claim 1, wherein the compressed air provision device is configured to take into account, as the one or more pressure values, a breakaway pressure, a supply pressure, an initial pressure in the first pressure chamber, an initial pressure in the second pressure chamber, a target pressure for the first pressure chamber, a final pressure of the first pressure chamber in a previous actuation of the actuator element and/or a pressure change of the pressure in the first pressure chamber.

11. The compressed air provision device according to claim 1, wherein the compressed air provision device is configured to take into account one or more system parameters when calculating the aeration duration.

12. The compressed air provision device according to claim 11, wherein the system parameters depend on a geometry of a system volume to be aerated during the aeration of the first pressure chamber.

13. The compressed air provision device according to claim 11, wherein the compressed air provision device is configured to calculate the aeration duration based on a model taking into account a plurality of variations of parameter values of the one or more system parameters.

14. The compressed air provision device according to claim 1, wherein the compressed air provision device is configured to determine the actuation specification and the actuation specification comprises a position specification, a movement specification, a pressure specification and/or a force specification.

15. The compressed air provision device according to claim 14, wherein the compressed air provision device is configured to perform a plurality of actuations of the actuator element and to determine the actuation specification individually for each actuation.

16. The compressed air provision device according to claim 14, wherein the compressed air provision device is configured to determine the actuation specification based on a breakaway pressure detected during aeration of the first pressure chamber and/or the compressed air provision device is configured to determine the actuation specification on the basis of an initial pressure in the second pressure chamber and/or a continuously determined difference between the pressures of the first pressure chamber and the second pressure chamber.

17. A system comprising the compressed air provision device according to claim 1 and the pneumatic actuator.

18. A method of operating a compressed air provision device according to claim 1, comprising the steps of calculating the aeration duration and aerating the first pressure chamber according to the calculated aeration duration to effect actuation according to the actuation specification.

19. The method according to claim 18, comprising the further steps of: when commissioning the compressed air provision device in an application system, performing one or more configuration actuations of the actuator element in a state in which the compressed air provision device is installed in the application system to adapt the calculation of the aeration duration to the application system.

20. The method according to claim 18, comprising the further step of: performing a plurality of training actuations in which parameter values of one or more system parameters are varied, to generate a model on the basis of which the calculation of the aeration duration is performed.

21. A compressed air provision device for industrial automation, for aerating a first pressure chamber of a pneumatic actuator in order to actuate an actuator element of the pneumatic actuator in accordance with an actuation specification, the compressed air provision device being configured to calculate an aeration duration and to aerate the first pressure chamber in accordance with the calculated aeration duration in order to bring about an actuation of the actuator element in accordance with the actuation specification, wherein the compressed air provision device is configured to calculate the aeration duration during the aeration of the first pressure chamber, and wherein the compressed air provision device is configured to take into account, when calculating the aeration duration, a pressure value which depends on a pressure and/or a pressure change in the first pressure chamber during the aeration of the first pressure chamber.

22. A compressed air provision device for industrial automation, for aerating a first pressure chamber of a pneumatic actuator in order to actuate an actuator element of the pneumatic actuator in accordance with an actuation specification, the compressed air provision device being configured to calculate an aeration duration and to aerate the first pressure chamber in accordance with the calculated aeration duration in order to bring about an actuation of the actuator element in accordance with the actuation specification, and wherein the pneumatic actuator further comprises a second pressure chamber which, in the aerated state, counteracts the actuation of the actuator element, the compressed air provision device being configured, in the course of the actuation of the actuator element, to de-aerate the second pressure chamber before or after the start of the aeration of the first pressure chamber.

* * * * *